May 15, 1956  H. O. CADMAN  2,745,537
CONTINUOUS FEED MECHANISM
Filed Feb. 7, 1951  5 Sheets-Sheet 1
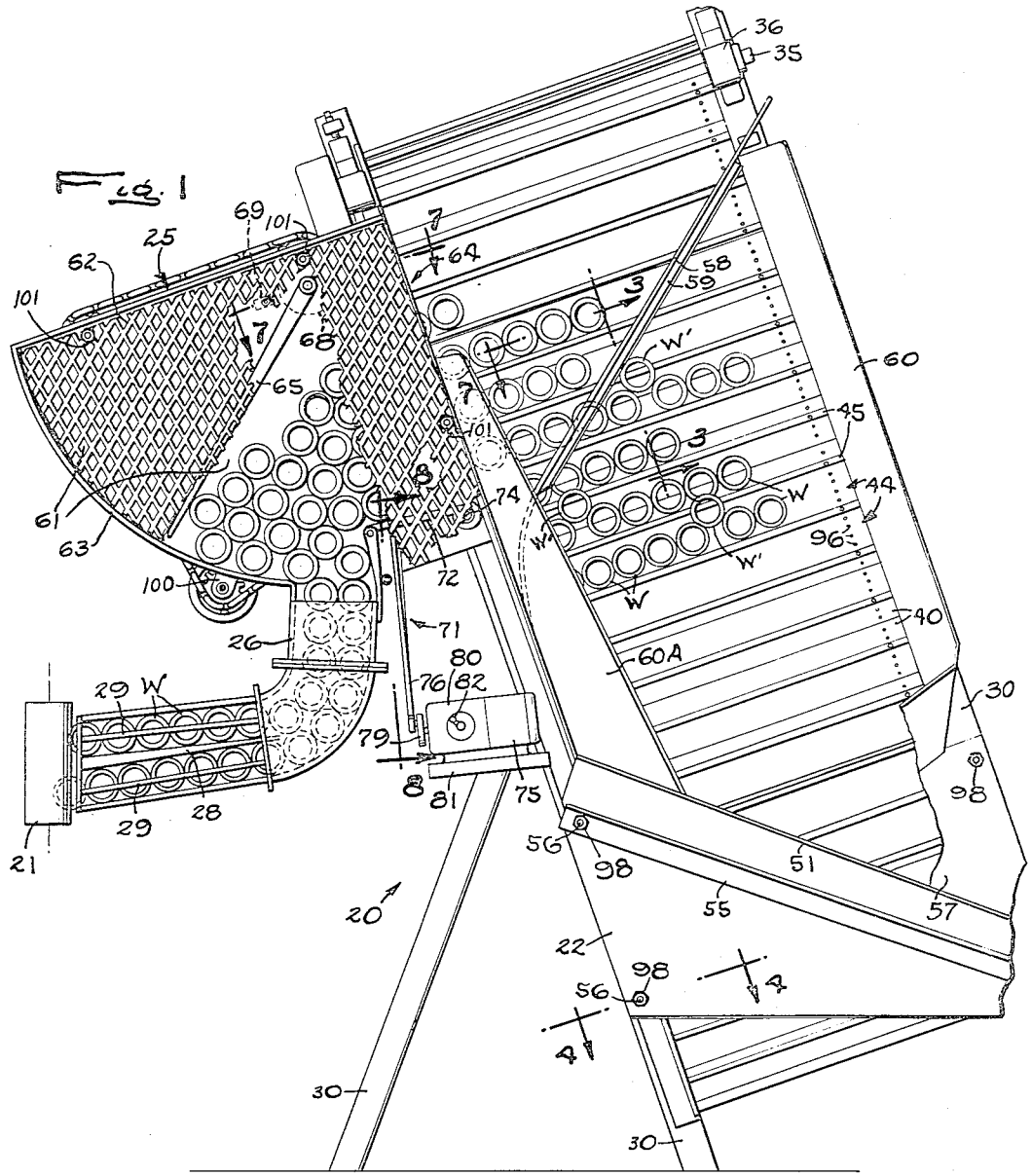
INVENTOR
Harold O. Cadman
Carlson, Pitzner, Hubbard & Wolfe
ATTORNEY

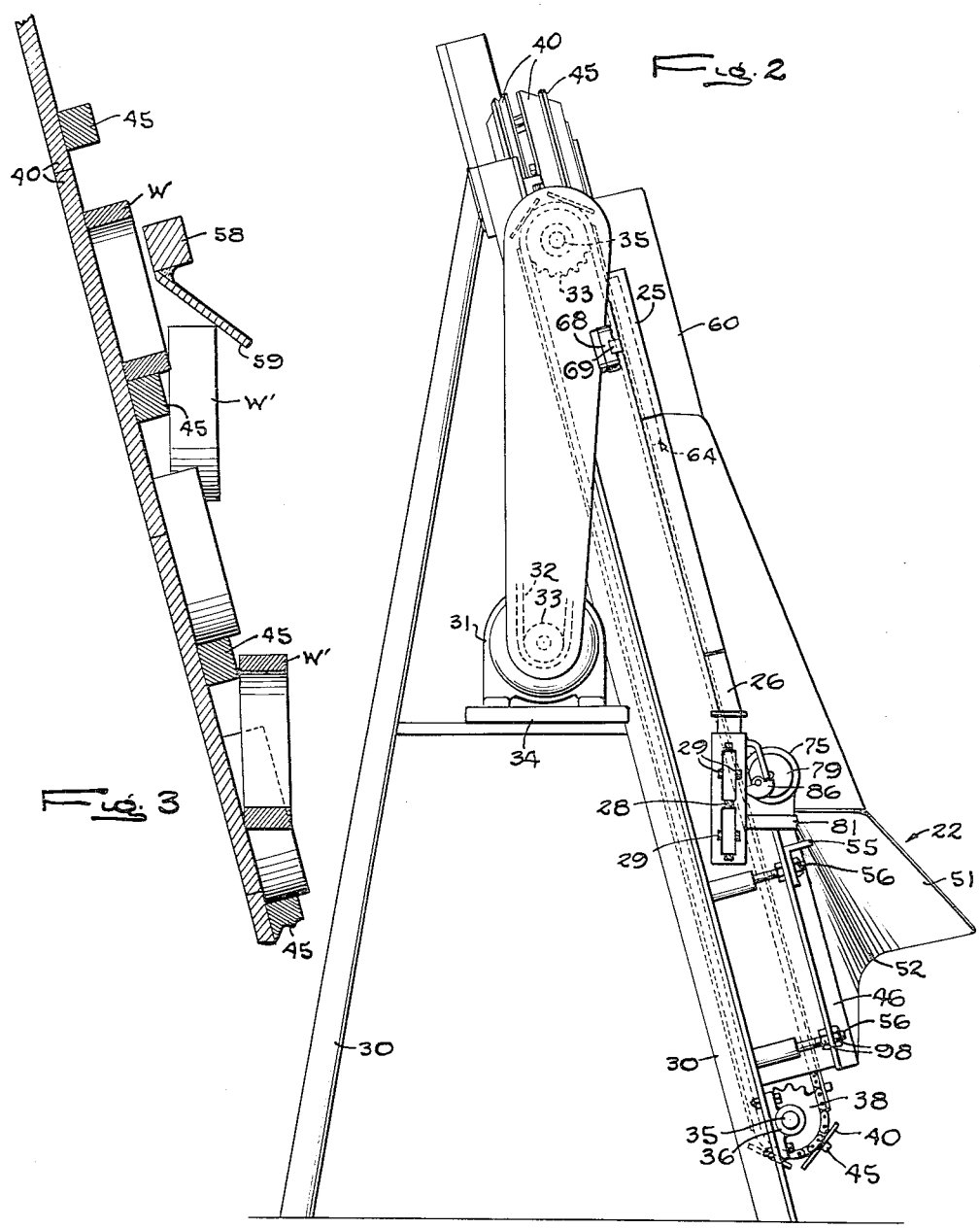

May 15, 1956
H. O. CADMAN
2,745,537
CONTINUOUS FEED MECHANISM
Filed Feb. 7, 1951
5 Sheets-Sheet 3
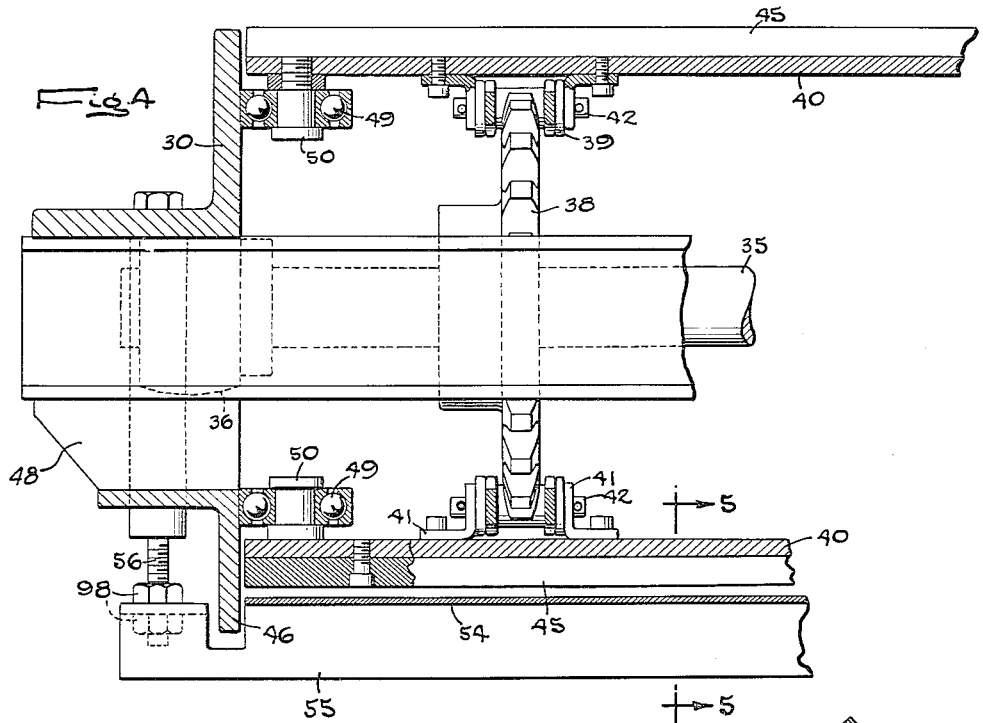
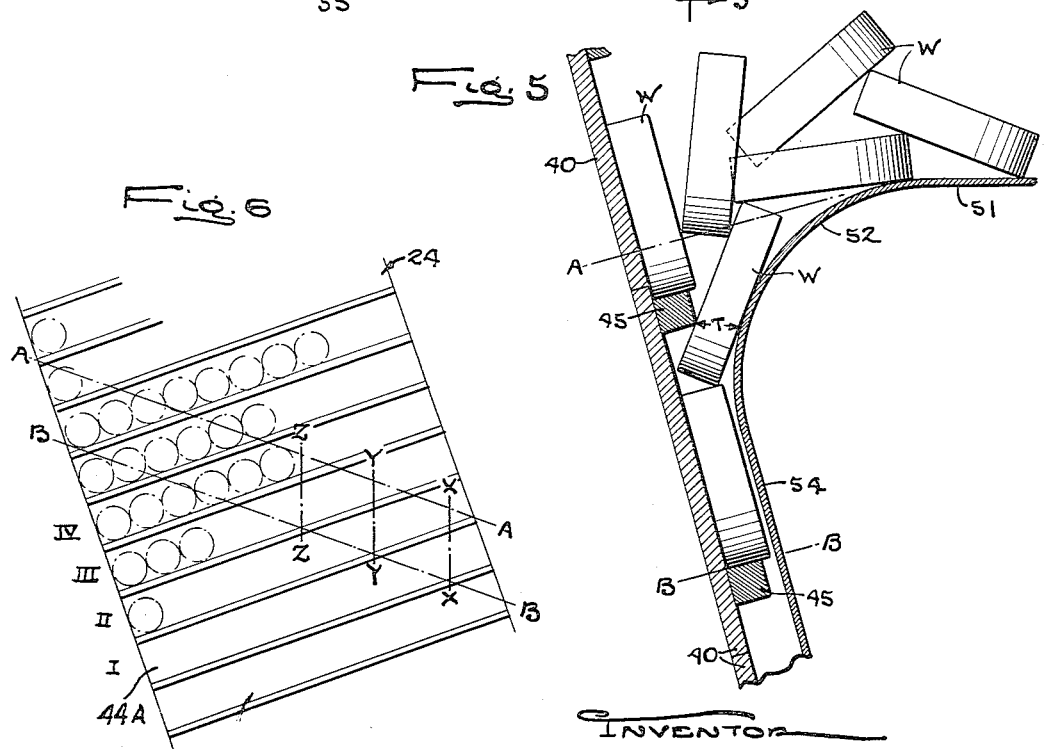
INVENTOR
Harold O. Cadman
Carlson, Pitzner, Hubbard & Wolfe
ATTORNEY

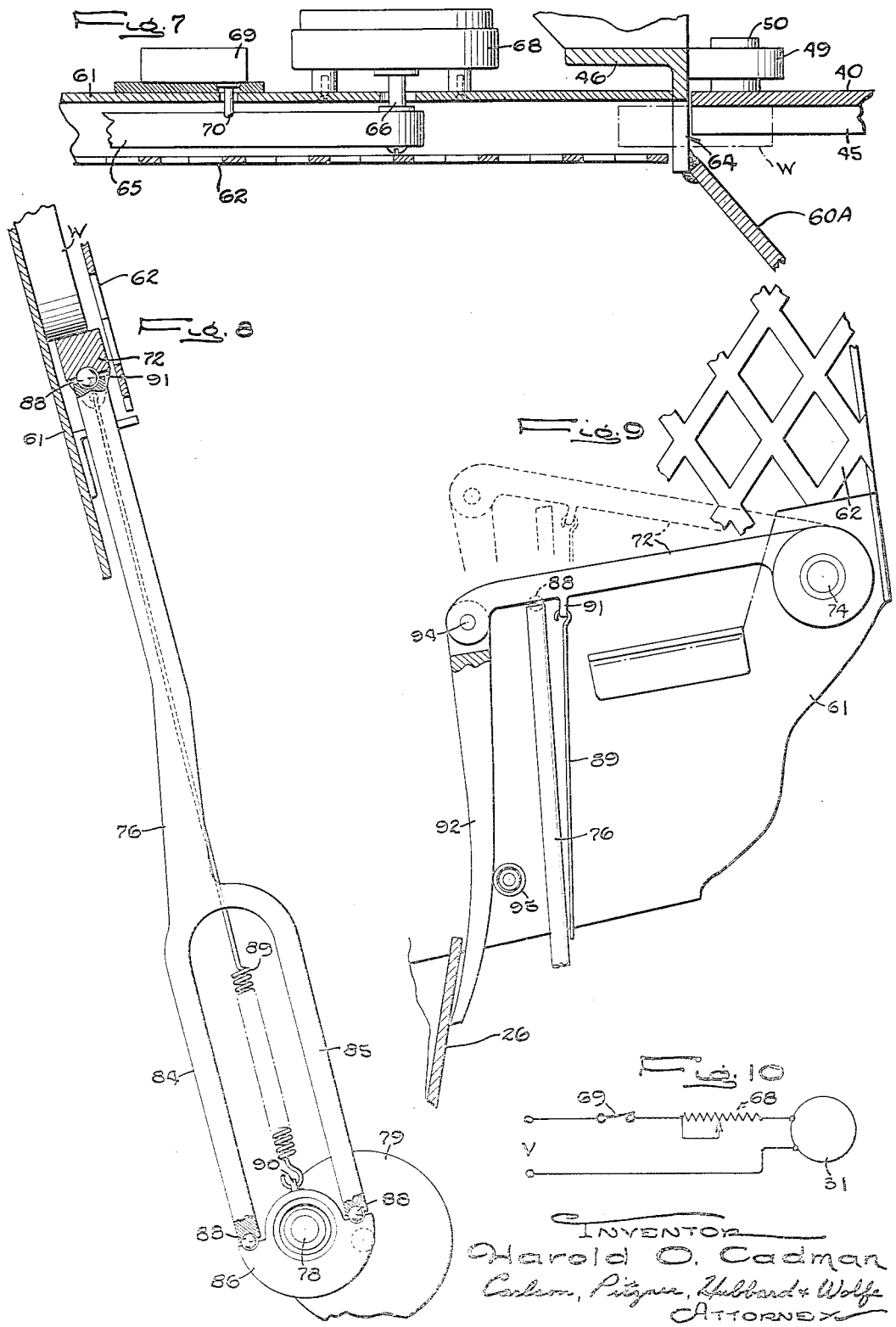

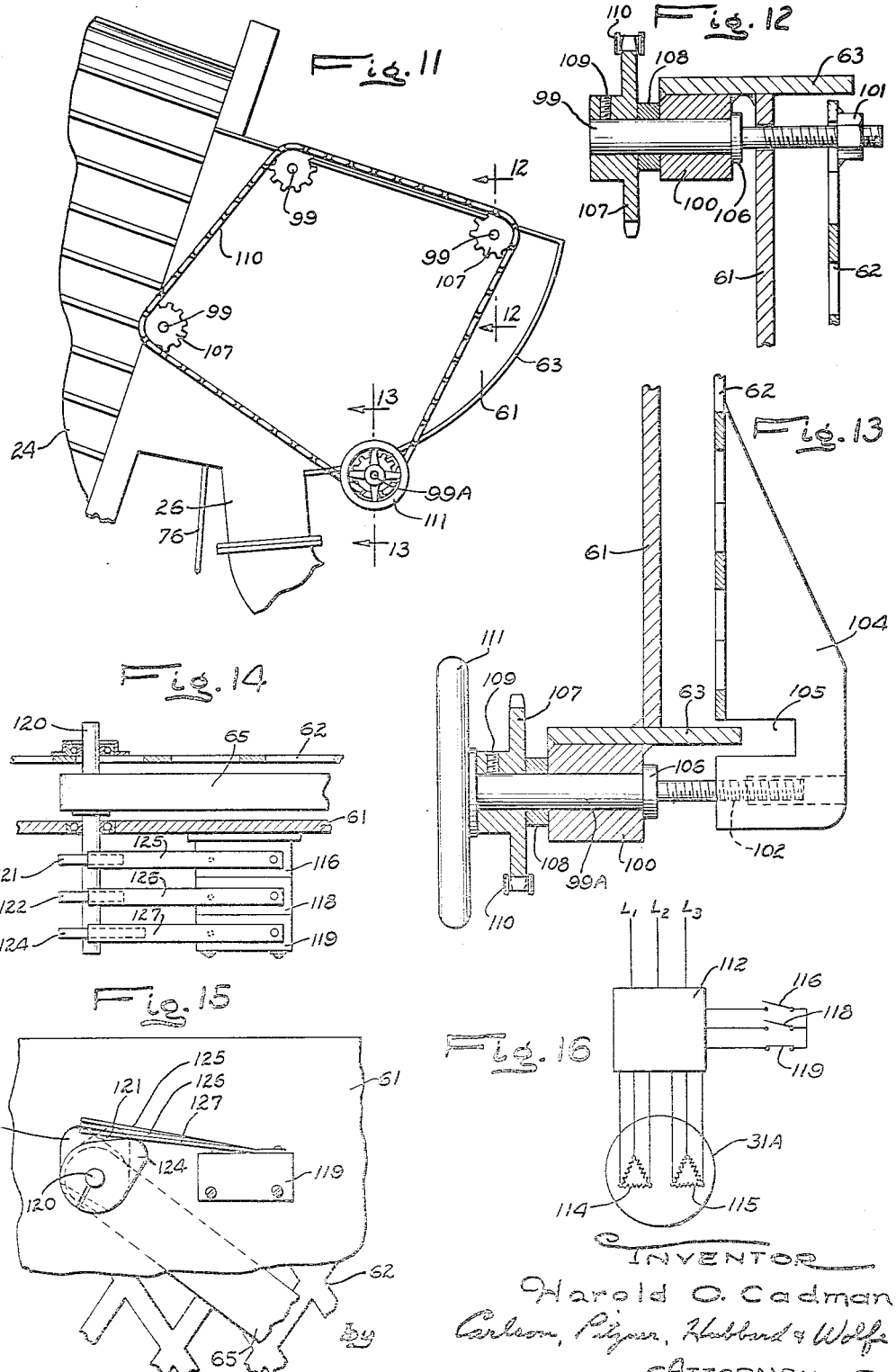

United States Patent Office 2,745,537
Patented May 15, 1956

2,745,537
CONTINUOUS FEED MECHANISM

Harold O. Cadman, Rockton, Ill., assignor to Gardner Machine Company, South Beloit, Ill., a corporation of Illinois Application February 7, 1951, Serial No. 209,867

10 Claims. (Cl. 198—33)

The present invention relates generally to work-handling devices and more specifically to a novel mechanism for the continuous feeding of a plurality of substantially circular workpieces to a machine tool or other appropriate receiving means. The invention finds particular, but by no means exclusive, utility when used for feeding a procession of annular workpieces between the opposed grinding faces of a pair of spaced apart abrasive wheels on a grinding machine.

One object of the invention is to provide a novel mechanism for withdrawing substantially circular workpieces from a source of supply and feeding them to a receiving means in a continuous procession at a controlled but variable rate.

Another object is to provide a continuous feed mechanism of the character set forth and which will be capable of feeding workpieces at a sufficiently high rate to supply simultaneously two or more machine tools or other receivers.

A further object is to provide a continuous feed mechanism of the foregoing type and which will be adapted to present workpieces to a single receiving means in a plural procession.

Still another object is to provide a continuous feed mechanism of the character set forth and capable of supplying workpieces to grinding machines of the type referred to above at rates equal to the productive capacities of such machines, the feed mechanism also being potentially capable of supplying workpieces at rates substantially in excess of the productive capacities of such machines.

A further object is to provide a feed mechanism of the foregoing type and capable of handling workpieces at rapid rates with negligible churning of the workpieces and a minimum consumption of power.

Other objects and advantages will become apparent from the following description, taken in connection with the accompanying drawings in which:

Figure 1 is a front elvation of an illustrative feed mechanism embodying the present invention, certain portions of the mechanism being broken away to illustrate internal parts thereof.

Fig. 2 is an elevational view of the left-hand side of the illustrative mechanism of Fig. 1.

Fig. 3 is an enlarged vertical sectional view taken in the plane of the line 3—3 in Fig. 1.

Fig. 4 is an enlarged fragmentary horizontal sectional view taken in the plane of the line 4—4 in Fig. 1 and detailing certain elements of the hopper and lift conveyor.

Fig. 5 is an enlarged fragmentary vertical sectional view through the hopper and lift conveyor taken in the plane of the line 5—5 in Fig. 4.

Fig. 6 is a diagrammatic view illustrating the relationship between the hopper and the conveyor.

Fig. 7 is an enlarged fragmentary sectional view taken through the workpiece reservoir of the illustrative mechanism and in the plane of the line 7—7 in Fig. 1.

Fig. 8 is an enlarged fragmentary vertical sectional view taken in the plane of the line 8—8 in Fig. 1 and showing a portion of the agitator means.

Fig. 9 is an enlarged fragmentary elevational view detailing a portion of the agitator means shown in Fig. 1.

Fig. 10 is a diagrammatic view illustrating one form of control circuit for the lift conveyor drive motor.

Fig. 11 is a fragmentary rear elevation of the mechanism of Fig. 1 showing the reservoir adjusting arrangement.

Figs. 12 and 13 are enlarged fragmentary vertical sectional views taken respectively in the planes of the lines 12—12 and 13—13 in Fig. 11.

Fig. 14 is an enlarged fragmentary sectional view taken transversely through the reservoir and showing a slightly modified form of control means.

Fig. 15 is an enlarged fragmentary elevation showing further details of the modified control means illustrated in Fig. 14.

Fig. 16 is a diagrammatic view illustrating one form of control circuit for the lift conveyor drive and modified control means shown in Figs. 14 and 15.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claims.

Referring more specifically to Fig. 1, the invention is there shown embodied in an illustrative feed mechanism 20 adapted in this instance to feed a plurality of annular workpieces such as rings W in a continuous double procession to wringer rolls 21 and thence to an appropriate receiving means (not shown). Such means may, of course, comprise one or more grinding machines or some other type of receiver. The mechanism 20 comprises a hopper 22 adapted to store a haphazardly disposed quantity of the workpieces W, a conveyor 24 adapted to withdraw workpieces from the hopper and to present them in an orderly manner to a reservoir 25 which supplies them to the wringer rolls 21. Workpieces are permitted to leave the reservoir 25 via a discharge duct 26, are divided into two processions by separator bar 28, and then pass into a pair of guideways 29 which in this case are defined by a plurality of vertically and horizontally spaced bars. The mechanism 20 is assembled upon a plurality of generally upright structural members 30, the lower ends of which constitute supporting legs. The conveyor 24 is powered by means of a suitable drive motor 31 connected thereto as by means of a chain and sprocket drive 32, 33, the motor being supported as by means of struts 34 running transversely of the structural members 30 (see Fig. 2).

Turning now to the conveyor 24 per se, it will be perceived upon reference to Figs. 1 to 4, inclusive, that the same comprises upper and lower supporting shafts 35 journaled in appropriate bearings 36 located adjacent the upper and lower extremities of the structural supporting members 30. Keyed or otherwise rigidly secured in axially spaced relation on each of the shafts 35 is a pair of sprockets 38. Trained around and disposed in meshing engagement with corresponding ones of the sprockets 38 in each of the sprocket pairs is a pair of laterally spaced endless chains 39 which thereby interconnect both of the shafts 35 for rotation in unison. Pivotally attached in side-by-side relation against the outer peripheries of the chains 39 are a plurality of backing plates 40. As shown more clearly in Fig. 4, each of the plates 40 may be fastened to the chains 39 (adjacent each of its ends) by means of spaced sets of brackets 41, each set having a pivot pin 42 passing through the overlapping side plates of an adjacent pair of chain links. By reason of the structure thus far described, it will be appreciated that when the shafts 35, together with their associated sprockets 38 and chains 39, are rotated by means of the drive motor 31, the backing plates 40 will move bodily with the chains 39 and in the same orbital path of movement, such action being somewhat analogous to the operation of a treadmill.

For the purpose of receiving quantities of the workpieces W withdrawn from the hopper 22, the conveyor 24 is provided with a series of open-ended channels 44. This is accomplished by mounting on each of the backing plates 40 a relatively narrow bar or cleat 45 (Figs. 1, 3 and 4) having a length approximately equal to that of the backing plate. Each of the cleats 45 in this instance happens to be disposed intermediate the longitudinal edges of its associated backing plate 40 but in substantially parallel relation therewith.

In order to facilitate retention of the workpieces W within the channels 44 and also to assure positive discharge of workpieces from such channels, the conveyor 24 is mounted in an attitude of sideward and rearward inclination with respect to the hopper. In the present instance, the conveyor 24 leans toward the left and to the rear, as viewed in Fig. 1, the lower ends of the channels 44 having associated therewith a fixed abutment which is adapted to retain the workpieces in the channels until the workpieces have been elevated sufficiently for presentation to the reservoir 25. Such an abutment is constituted by an angle bar 46 which is mounted in closely spaced relation with the left-hand edge of the forward or front face of the conveyor and supported in spaced relation with main structural member 30 as by means of block (Fig. 4). The lateral thrust of the backing plates 40 due to the sideward inclination of the conveyor is conveniently balanced by thrust rollers 49, one such roller being fixed to each plate by means of a headed boss 50. The adjacent faces of the main structural member 30, as well as the abutment bar 46, serve as a convenient means of lateral support for the thrust rollers 49.

Provision is made for rapid loading of the conveyor 24 with a minimum of tumbling or churning of the workpieces. This eliminates undesirable rounding of edges on workpieces such as piston rings and, in addition, conserves driving power. In furtherance of such objective, the hopper 22 is constructed with a downwardly and laterally sloping floor 51 (Figs. 1, 2 and 5). The latter has a portion 52 curving downwardly as it approaches the conveyor and terminating in an end portion 54 which is nested in closely spaced and substantially parallel relation with the adjacent face of the conveyor 24. The hopper in general and particularly the portion 54 thereof is stiffened as by means of an angle bar 55 fixed to structural members 30 as by means of bolts 56.

Upon closer reference to Fig. 1, it will be noted that the hopper floor 51 is sloped laterally from the horizontal in a direction opposite to the lateral slope of the conveyor 24 and the workpiece receiving channels 44 thereon. With the assistance of side paneling 57, the structure just described defines at the open end of the hopper a substantially triangular loading zone which extends down toward the lower right-hand end of the conveyor 24 and exposes the high ends of the channels 44 shortly after they enter the bottom of the hopper. This initiates a progressive and orderly loading action in the channels 44 since the workpieces W will slide into the upper ends of the channels as soon as there is sufficient clearance between the cleats 45 and the curved portion 52 of the hopper floor. Due to the lateral inclination of the channels 44, the workpieces W will roll down toward their lower ends and fill the channels from left to right as viewed in Fig. 1. Thus by the time the channels 44 have traveled from the bottom of the loading zone, where they are exposed to a comparatively narrow group of workpieces, to the upper portion of the loading zone, where the channels are exposed to a considerably wider group of workpieces, the channels have already been filled substantially. The presentation of substantially filled channels to the haphazard heap of workpieces in the upper portion of the loading zone produces comparatively little agitation or churning of the workpieces compared with what would be produced if the channels were empty in that region.

Turning now to Figs. 5 and 6, the loading action just described has been illustrated diagrammatically. In this instance, the line A—A represents the plane of downwardly sloping hopper floor 51 projected on the face of conveyor 24. The line B—B represents the locus of the points on the respective cleats 45 where there is a clearance between the overlying cleat and the curved portion 52 of the hopper floor equal at least to the thickness T of the workpiece, such clearance extending to the right-hand or high end of the channel defined by the two associated cleats. It will be apparent from the diagram in Fig. 6 that when one of the channels 44, which for purposes of description will be designated by the numeral 44A, occupies the position I, it is free to receive workpieces to the right of the vertical plane $x$—$x$. When subsequent movement of the conveyor 24 has elevated the channel 44A to the position II, it will be apparent that the channel is adapted to receive workpieces to the right of the vertical plane $y$—$y$. As a result, one or more workpieces drop into the channel 44A and roll toward its lower end as indicated in the diagram. Similarly, further elevation of the conveyor 24 brings the channel 44A to the position designated III whereby the channel is adapted to receive workpieces to the right of the vertical plane $z$—$z$. It will be noted that by the time the channel 44A has reached position IV, it has already picked up most of the workpieces W which it will acquire from the hopper 22. Consequently, upon further lifting of the conveyor 24, the channel 44A presents a relatively smooth surface to the heap of workpieces accumulated in the hopper 22. Such action thereby minimizes churning or agitation of the workpieces and conserves power, as pointed out above.

For the purpose of handling workpieces W which make only a partial entry into the channels 44, as indicated in Figs. 1 and 3, a novel arrangement has been provided. Accordingly, there is mounted in closely spaced and overlying relation with the front face of the conveyor 24 a wiper preferably in the form of a bar 58. The latter is fixed to the structural members 30 on either side of the conveyor and is disposed in skewed or diagonal relation with the path of movement of the conveyor. The left-hand end of the bar 58 (as viewed in Fig. 1) is located at about the middle of the left-hand support 30 and its right-hand end is anchored adjacent the upper end of the right-hand support 30. Rigidly fixed to the wiper bar 58 and extending from the high side of the conveyor substantially to its lower side is a fending plate 59. The latter is disposed at an acute angle to the front face of the conveyor 24, the apex of such acute angle being located immediately adjacent the wiper bar 58. The operation of the wiper bar 58 and the fending plate 59 will be apparent upon consideration of Figs. 1 and 3. Thus, as the conveyor 24 travels upwardly, the out-of-place workpieces W' are successively accosted by the fending plate 59. If the channel 44 into which the workpiece W' projects is only partially filled, the fending plate 59 will serve to cam the workpiece W' down into the channel, forcing some of the uppermost rings to the right in order to make room for such workpiece. In the event that such channel should already be full, the action will be the same except for the fact that the workpiece adjacent the upper end of the channel will spill out. Under the guidance of apron plate 60, the spilled workpiece will either drop into the end of an underlying channel which is not completely full, or, alternatively, may descend all the way back to the hopper 22. To cover the remote possibility that one or more of the out-of-place workpieces W' may be cammed out of its channel completely and slide along the face of the conveyor toward its lower edge, a second apron plate 60A is mounted adjacent the lower edge of the conveyor and guides the workpiece back to the hopper.

Certain types of workpieces, such as inner bearing races, sometimes tend to remain in an out-of-place position as illustrated by the workpiece W' in Fig. 3 due to interlocking of their bearing grooves. Such workpieces may resist the action of the wiper. Consequently, the wiper bar 58 may be constructed with sufficient resiliency to permit a badly jammed workpiece to ride thereunder, the jammed workpiece spilling back into the hopper as the others are discharged from the channel 44 into the reservoir.

Turning now to the reservoir 25, it will be noted in Fig. 1 that the same is located in this instance near the upper end of the conveyor 24 but at the lower edge thereof. The reservoir 25 of the illustrative mechanism 20 is defined by a rear panel 61 of imperforate sheet metal, a front panel 62 of perforate or mesh construction, and a relatively narrow, strap-like peripheral wall 63. The panels 61, 62 are preferably spaced from each other by a distance only slightly greater than the thickness of one of the workpieces W, enabling the reservoir to accumulate only a single layer of the workpieces W and thereby facilitating discharge of the same. The reservoir 25 is fixed to the structural member 30 in substantially parallel, coplanar relation with the front face of the conveyor, and in particular with the lower ends of the workpiece channels 44. The reservoir is adapted to receive workpieces from the channels 44 via a gate 64 (Figs. 1 and 7) in the upper portion of its side wall adjacent the conveyor, such gate being defined as by means of a slot in the upper portion of the angle bar 46 located slightly below the top edge of the reservoir. From the foregoing, it will be apparent that as the conveyor 24 carries the loaded channels 44 upwardly, the workpieces W will spill through the gate 64 and accumulate in the reservoir 25, assuming the rate of discharge therefrom so permits.

Provision is made for driving the conveyor 24, either at variable speed or intermittently, in direct response to the quantity of workpieces on hand in the reservoir. Referring once more to Figs. 1 and 7, it will be observed that this is accomplished in the illustrative mechanism 20 by the use of a variable speed drive and a control comprising a floating bar 65 pivoted in the upper part of the reservoir 25 in the vicinity of the gate 64 and adapted to rise and fall with the level of the workpieces in the reservoir. The bar 65 is keyed or otherwise rigidly fixed to rotatable stem 66 of a control rheostat 68 anchored to the reverse side of rear panel 61 of the reservoir. In this instance, the rheostat 68 is connected into the power supply circuit of the conveyor drive motor 31, as shown in Fig. 10, so as to control the speed of such motor and hence that of the conveyor 24. The arrangement is such that an upward swing of the bar 65 due to a rise in the level of the workpieces tends to decrease the speed of the conveyor motor. On the other hand, a downward swing of the bar 65, due to a drop in the level of the workpieces in the reservoir, results in adjustment of the rheostat 68 in a proper direction to increase the speed of the conveyor drive motor 31. By selecting a rheostat and conveyor drive motor with appropriate characteristics, it will be appreciated that the foregoing arrangement may be adapted to maintain a sufficient supply of workpieces in the reservoir 25 to assure a continuous, even flow of workpieces to the wringer rolls 21.

The workpiece level control means associated with the reservoir 25 also includes a safety feature in the form of a limit or stop switch 69 which in this case is also fixed to the rear panel 61 of the reservoir. The switch 69 is mounted near the top of the reservoir and has its actuating plunger 70 projecting through an opening in the panel 61 for interception of the floating bar 65 when the latter reaches its upper extreme or high level position due to substantial filling of the reservoir. When the bar 65 reaches such position, it will be noted that the bar will cam the actuating plunger 70 toward the switch 69, thereby opening the same. Since the switch 69 is interposed in the conveyor drive motor circuit, as indicated in Fig. 10, opening of this switch will stop the conveyor, permitting the workpiece level in the reservoir to fall to a desired point.

For the purpose of preventing bridging of the workpieces across the mouth of the discharge duct 26 with a resulting interruption of the flow of workpieces from the reservoir into the duct, an agitator 71 is operatively associated with the reservoir. The agitator in this instance comprises an oscillating arm 72 pivoted on boss 74 fixed to the rear panel of the reservoir, together with an agitator motor 75 which oscillates the arm 72 through a pitman 76. The latter is driven by crank pin 78 which projects from rotating disk 79 of a variable speed connection 80 (Figs. 1 and 8). In the illustrative mechanism 20, the variable speed connection is assembled as an integral unit with agitator motor 75, such unit being mounted on a platform 81 fixed to the structural member 30. The speed of oscillation of the arm 72 may, of course, be varied for the different types of workpieces contained in the reservoir by the use of an adjusting crank 82 mounted on the device 80. To permit a certain amount of flexibility in the connection between the crank pin 78 and the oscillating arm 72, the pitman 76 is formed with a bifurcated lower end terminating in legs 84 and 85. The latter are connected in opposed, abutting relation with the arcuate extremities of a semi-circular member 86, a pair of thrust balls 88 being interposed therebetween. Similarly, another thrust ball 88 is interposed between the upper end of the pitman 76 and the oscillating arm 72. These parts are maintained in assembled relation by the use of tensile spring 89 connected between an eye 90 on the member 86 and a second eye 91 on the oscillating arm 72.

In order to permit the oscillating arm 72 to swing through a substantial arc and at the same time avoid accidental discharge of workpieces between the arm 72 and the upper side wall of the discharge duct 26, the arm 72 has pivotally attached in depending relation with its free end a movable wall section 92. The latter is pivoted to the arm 72 as by means of pin 94 and its lower end extends down into nested relation with the outer face of the discharge duct side wall, being confined in such position by means of a suitable roller 95 mounted on the reservoir panel 61.

The mechanism 20 described herein is designed to accommodate workpieces of various diameters and thicknesses with equal facility. For this purpose, each of the backing plates 40 of the conveyor 24 is formed with several sets of holes 96 (Fig. 1) for securing the cleats 45 thereto at various distances apart, thus selectively defining channels having widths proportional to the diameter of the particular group of workpieces to be handled. By the same token, where it is necessary for the mechanism 20 to handle workpieces substantially thicker than the workpieces W, the cleats 45 may be superseded by similar cleats of a thickness which is proportional to the thickness of the new workpieces. To permit this to be done, provision is made for adjustably positioning the hopper wall 54 farther out from the face of the conveyor. Such adjustment may readily be effected as by means of adjusting nuts 98 carried by the supporting bolts 56 (see Figs. 1 and 4).

Provision is also made for adjustably varying the distance between the reservoir panels 61, 62 to accommodate workpieces of various thicknesses. As shown in Figs. 11 to 13, inclusive, this is accomplished in the mechanism 20 by the use of a plurality of adjusting studs 99, 99A each journaled in an appropriate bearing block 100 fixed to the peripheral wall 63 or directly to the rear panel 61. Each of the adjusting studs 99 projects through alined openings in the reservoir panels 61, 62 and terminates in a threaded portion which engages one of a series of nuts 101 fixed to the outer face of the panel 62. The stud 99A, being located outside the reservoir below the peripheral wall 63, has a threaded portion which engages a tapped bore 102 located in the depending end of a bracket 104 fixed to the panel 62. The bracket 104 is also formed with a suitable slot 105 to provide clearance with the peripheral wall 63 upon adjustment of the panel 62. Each of the studs 99, 99A may be retained in its bearing block 100 by means of an integral collar 106, which engages one end of the block, and a sprocket wheel and spacer 107, 108 located at the opposite end of the bearing block. Each sprocket wheel 107 is rigidly fixed to its corresponding adjusting stud as by means of a set screw 109. The sprocket wheels 107 are connected for adjustment in unison by means of endless chain 110 which meshes therewith. In order to permit adjustment of the spacing between the panels 61, 62 from either the front or the back of the mechanism 20, the lowermost adjusting stud 99A has fixed on its rearward end an adjusting hand wheel 111. Other means such as a hand crank may, of course, be connected to any one of the adjusting studs in lieu of the wheel 111.

Turing now to Figs. 14 to 16, inclusive, there is shown a slightly modified arrangement for controlling the drive of the conveyor 24. In this instance, the conveyor may be provided with a driving motor 31A of the two-speed alternating current type, shown diagrammatically in Fig. 16. The motor 31A may have associated therewith an appropriate controller 112 adapted to apply power from supply lines L1, L2, L3 to low speed winding 114 or, alternatively, to high speed winding 115. Operatively associated with the controller 112 are normally open control switches 116, 118, adapted respectively to energize either the low speed winding 114 or the high speed winding 115 of the motor by means of the controller 112. Also operatively associated with the controller 112 is a normally closed stop switch 119 adapted, when opened, to actuate the controller 112 so as to deenergize the motor 31A regardless of its operating speed. In order to utilize the foregoing circuit, the floating bar 65 is pivotally mounted in the reservoir 25 by means of a cam shaft 120 journaled in suitable bearings carried by the panels 61, 62. The cam shaft 120 projects for a considerable distance rearwardly of the panel 61 and has rigidly fixed in axially spaced relation thereon a plurality of cams 121, 122, 124. Mounted in a stack on the rear face of the panel 61 in proximity to the shaft 120 and its cams are the switches 116, 118 and 119. The switches 116, 118, 119 are provided with individual actuating arms 125, 126, 127 which respectively ride upon corresponding ones of the cams 121, 122, 124. By reason of the foregoing structure, it will be noted that when the bar 65 possesses a steeply inclined attitude due to a relatively low supply of workpieces in the reservoir 25, the cam 122 will be effective to close the high speed switch 118 and maintain the high speed winding 115 in an energized condition. As the supply of workpieces in the reservoir builds up and the floating bar 65 approaches a less steeply inclined attitude, such as that indicated in Fig. 15, the switch 118 will have opened and the cam 121 will become effective to close the low speed switch 116 through its actuating arm 125. This causes the conveyor drive motor 31A to operate on the low speed winding 114. If, however, the supply of workpieces in the reservoir should increase still further, the floating bar 65 will approach a horizontal attitude, opening the high speed control switch 118 and also opening the stop switch 119 due to contact between the nose of the cam 124 and the actuating arm 127 of the switch 119. Opening of the latter, of course, deenergizes the conveyor drive motor 31A until the level of workpieces in the reservoir 25 has dropped to the point where additional workpieces are required.

The control arrangement just described can be further modified simply by using a single speed motor for driving the conveyor 24 and eliminating one of the switches 116, 118 along with its associated cam. The remaining one of these switches and its associated cam could then be arranged to serve as a lower limit control, starting the conveyor drive motor when the supply of workpieces in the reservoir has reached a low point and allowing the motor to run until the reservoir has been substantially filled. At this point, the conveyor drive motor would be deenergized by means of the stop switch 119 and its associated cam, the conveyor drive motor remaining idle until the supply of workpieces has again been depleted to the predetermined low point.

Upon reflection, it will be apparent that the feeding mechanism 20 described above adequately fulfills the objectives set forth earlier herein. As a matter of fact, one such mechanism actually built and tested was found capable of feeding a continuous procession of ring-type workpieces at the rate of 264 per minute. Feeding speeds even higher than this are possible with mechanisms embodying the invention, the limiting factor at the present time being the capacity of the receiving means to accept the workpieces at the rate provided by the feeding mechanism.

I claim as my invention:

1. A mechanism for feeding substantially circular workpieces in a continuous procession from a source to a machine tool or other receiving means, said mechanism comprising the combination of a hopper, an endless lift conveyor operatively associated with said hopper and having a plurality of channels for receiving workpieces therefrom, structural supports for maintaining said lift conveyor in a rearwardly and laterally inclined attitude with respect to said hopper, a variable speed drive connected with said conveyor for elevating the loaded channels thereof, fixed abutment means on one of said structural supports for retaining workpieces in the channels of said lift conveyor during elevation thereof, a workpiece reservoir adapted to receive workpieces presented thereto by said conveyor, said reservoir being located at a level substantially above said hopper, a diagonal wiper bar overlying the face of said conveyor between said hopper and said reservoir, a control in said reservoir for regulating said variable speed drive in relation to the level of workpieces in said reservoir, a discharge duct located at the bottom of said reservoir for withdrawing workpieces therefrom in a continuous procession, and an agitator operatively associated with said reservoir for precluding obstruction of said discharge duct by bridging of workpieces thereacross.

2. A mechanism for feeding substantially circular workpieces in a continuous procession from a source to a machine tool or other receiving means, said mechanism comprising the combination of a hopper, a conveyor operatively associated with said hopper and having a plurality of channels for receiving workpieces therefrom, means for supporting said conveyor in a laterally inclined attitude with respect to said hopper, said hopper having a downwardly and laterally sloping floor, means for retaining workpieces in the channels of said conveyor during movement of the same, a workpiece reservoir operatively associated with said conveyor and adapted to receive workpieces therefrom, and a discharge duct located at the bottom of said reservoir for withdrawing workpieces therefrom in a continuous procession.

3. A mechanism for feeding workpieces in a continuous procession from a source to a receiver and comprising the combination of a hopper, a reservoir, conveyor means for withdrawing workpieces from said hopper and depositing them in said reservoir, a two-speed driving motor operatively connected with said conveyor, a floating bar mounted within said reservoir for rise and fall with the level of workpieces therein, a cam shaft journaled on said reservoir and rigidly fixed to said floating bar, a plurality of cams rigidly fixed to said cam shaft, a low speed switch, a high speed switch and a stop switch, all of said switches being mounted in proximity to said cam shaft for actuation by respective ones of said cams, said switches being connected in the circuit of said two-speed driving motor.

4. In a mechanism for feeding workpieces in a continuous procession from a source to a receiver, the combination comprising a hopper, a workpiece reservoir spaced from said hopper, conveyor means for withdrawing workpieces from said hopper and presenting them to said reservoir, a driving motor connected to said conveyor means, a movable member in said reservoir adapted to float with the rise or fall of the level of workpieces therein, a first limit switch connected with said driving motor circuit and being adapted to energize said motor, a second limit switch also connected with said driving motor circuit and being adapted to deenergize said motor, said limit switches being disposed for actuation by said movable member in response to variations in the level of workpieces within said reservoir.

5. In a mechanism for the continuous feeding of substantially circular workpieces from a source to a receiving means such as a machine tool, the combination of a hopper having an open end, a laterally and downwardly inclined floor in said hopper terminating at the open end thereof, an endless conveyor disposed in closely spaced relation with the open end of said hopper, means defining workpiece receiving channels in said conveyor, means for supporting said conveyor with said channels in laterally and rearwardly inclined relation to said hopper, the lateral inclination of said channels being opposite to the lateral inclination of said hopper floor, means for retaining workpieces in the lower ends of the channels, and means carried by said conveyor and engageable with said retaining means for sustaining side thrust on said conveyor.

6. In a mechanism for the continuous feeding of substantially circular workpieces from a source of supply to a receiving means, the combination comprising an open-ended hopper, an endless conveyor disposed in closely spaced relation with the open end of said hopper, a laterally and downwardly sloping floor in said hopper terminating in a portion curved downwardly toward said conveyor and an end portion, the latter overlying closely the face of said conveyor, a plurality of backing plates on said conveyor, cleats fixed to said backing plates and defining therewith a plurality of channels for receiving workpieces, means for supporting said conveyor in laterally and rearwardly inclined relation with said hopper, the lateral inclination of said channels being opposite to the lateral inclination of said hopper floor, and an abutment fixed to said support means in closely spaced relation with one longitudinal edge of said conveyor, said abutment being adapted to preclude premature discharge of workpieces from the lower ends of said channels.

7. In a mechanism for feeding a plurality of workpieces in a continuous procession, the combination of a reservoir having spaced apart front and rear panels separated by a peripheral wall, a discharge duct in said peripheral wall at the bottom of said reservoir, an agitating arm pivoted between said panels in place of a section of said peripheral wall adjacent the mouth of said discharge duct, a depending wall section pivoted on the free end of said arm and having its lower end nested outside said duct, an agitator motor, and a crank and pitman connection interposed between said motor and said agitating arm for oscillating the latter and preventing bridging of workpieces across the mouth of said duct.

8. A mechanism for feeding substantially circular workpieces in a continuous procession from a source to a machine tool or other receiving means, said mechanism comprising the combination of a hopper, an endless lift conveyor operatively associated with said hopper and having a plurality of channels for receiving workpieces therefrom, structural supports for maintaining said lift conveyor in a rearwardly and laterally inclined attitude with respect to said hopper, a variable speed drive connected with said conveyor for elevating the loaded channels thereof, fixed abutment means on one of said structural supports for retaining workpieces in the channels of said lift conveyor during elevation thereof, a workpiece reservoir adapted to receive workpieces presented thereto by said conveyor, said reservoir being located at a level substantially above said hopper, and a control in said reservoir for regulating said variable speed drive in relation to the level of workpieces in said reservoir.

9. A mechanism for feeding substantially circular workpieces in a continuous procession from a source to a machine tool or other receiving means, said mechanism comprising the combination of a hopper, an endless lift conveyor operatively associated with said hopper and having a plurality of channels for receiving workpieces therefrom, structural supports for maintaining said lift conveyor in a rearwardly and laterally inclined attitude with respect to said hopper, a variable speed drive connected with said conveyor for elevating the loaded channels thereof, fixed abutment means on one of said structural supports for retaining workpieces in the channels of said lift conveyor during elevation thereof, a workpiece reservoir adapted to receive workpieces presented thereto by said conveyor, said reservoir being located at a level substantially above said hopper, a diagonal wiper bar overlying the face of said conveyor between said hopper and said reservoir, and a control in said reservoir for regulating said variable speed drive in relation to the level of workpieces in said reservoir.

10. In a mechanism for the continuous feeding of substantially circular workpieces from a source to a receiving means such as a machine tool, the combination of a hopper, an endless conveyor disposed in closely spaced relation with said hopper, means defining workpiece receiving channels in said conveyor, means for supporting said conveyor with said channels in laterally and rearwardly inclined relation to said hopper, means for retaining workpieces in the lower ends of the channels, and means carried by said conveyor and engageable with said retaining means for sustaining side thrust on said conveyor.

References Cited in the file of this patent

UNITED STATES PATENTS

| Number | Name | Date |
|---|---|---|
| 602,804 | Hardenbrook | Apr. 19, 1898 |
| 711,306 | Good | Oct. 14, 1902 |
| 1,124,036 | Leach | Jan. 5, 1915 |
| 1,311,590 | Bingham | July 29, 1919 |
| 1,417,780 | Stephens | May 30, 1922 |
| 1,432,738 | Alwart | Oct. 24, 1922 |
| 1,794,794 | Newton | Mar. 3, 1931 |
| 1,857,815 | Lafferty | May 10, 1932 |
| 2,162,443 | Muller | June 13, 1939 |
| 2,175,541 | Probert | Oct. 10, 1939 |
| 2,367,278 | Hewlett | Jan. 16, 1945 |
| 2,496,548 | Rosa | Feb. 7, 1950 |
| 2,543,244 | Klooz et al. | Feb. 27, 1951 |
| 2,546,866 | Overly | Mar. 27, 1951 |
| 2,552,481 | Eberhardt et al. | May 8, 1951 |
| 2,609,912 | Engel | Sept. 9, 1952 |